(12) United States Patent
Gong et al.

(10) Patent No.: US 8,730,993 B2
(45) Date of Patent: May 20, 2014

(54) METHODS AND APPARATUS FOR UPLINK MU MIMO SCHEDULING

(75) Inventors: Michelle Gong, Sunnyvale, CA (US); Adrian P. Stephens, Cambridge (CA)

(73) Assignee: Intel Corporation, Santa Clara, CA (US)

( * ) Notice: Subject to any disclaimer, the term of this patent is extended or adjusted under 35 U.S.C. 154(b) by 615 days.

(21) Appl. No.: 12/834,165

(22) Filed: Jul. 12, 2010

(65) Prior Publication Data

US 2012/0008572 A1 Jan. 12, 2012

(51) Int. Cl.
*H04L 12/43* (2006.01)
*H04W 74/06* (2009.01)

(52) U.S. Cl.
CPC .................................... *H04W 74/06* (2013.01)
USPC ........... 370/461; 370/310; 370/328; 370/338; 370/345; 370/346; 370/449; 370/462

(58) Field of Classification Search
CPC ..... H04W 74/02; H04W 74/04; H04W 74/06; H04W 72/1263; H04W 72/1268
USPC ......... 370/310, 328, 338, 345, 346, 449, 461, 370/462
See application file for complete search history.

(56) References Cited

U.S. PATENT DOCUMENTS

| 6,009,077 | A  | * | 12/1999 | Firoiu et al. | 370/230 |
|-----------|----|---|---------|--------------|---------|
| 7,693,175 | B1 | * | 4/2010  | Benveniste   | 370/447 |
| 2005/0047425 | A1 | * | 3/2005 | Liu et al. | 370/411 |
| 2006/0215686 | A1 | * | 9/2006 | Takeuchi | 370/445 |
| 2006/0229023 | A1 | * | 10/2006 | Alon et al. | 455/69 |
| 2010/0118798 | A1 |  | 5/2010 | Chun et al. | |
| 2010/0271995 | A1 | * | 10/2010 | Seok et al. | 370/311 |
| 2010/0278065 | A1 | * | 11/2010 | Sun et al. | 370/252 |
| 2011/0158142 | A1 | * | 6/2011 | Gong et al. | 370/311 |
| 2011/0268054 | A1 | * | 11/2011 | Abraham et al. | 370/329 |
| 2012/0002634 | A1 | * | 1/2012 | Seok | 370/329 |

FOREIGN PATENT DOCUMENTS

| KR | 10-2008-0079382 | 9/2008 |
|----|-----------------|--------|
| KR | 10-2010-0067040 | 6/2010 |

OTHER PUBLICATIONS

Mirkovic, J.; Jing Zhao; Denteneer, D.; , "A MAC Protocol with Multi-User MIMO Support for Ad-Hoc WLANs," Personal, Indoor and Mobile Radio Communications, 2007. PIMRC 2007. IEEE 18th International Symposium on , vol., no., pp. 1-5, Sep. 3-7, 2007.*

Suraj K. Jaiswal, Aura Ganz, and Ramgopal Mettu. 2009. An Optimization Framework for Demand-based Fair Stream Allocation in MIMO Ad Hoc Networks, Mob. Netw. Appl. 14, (Aug. 4, 2009), 451-469.*

Mirkovic, J.; Walke, B.; Jing Zhao; , "Channel Aware Scheduling in MU-DCF WLANs," Wireless Communications, Networking and Mobile Computing, 2007. WiCom 2007. International Conference on , vol., no., pp. 1184-1187, Sep. 21-25, 2007.*

(Continued)

*Primary Examiner* — Phirin Sam
*Assistant Examiner* — Tarell Hampton
(74) *Attorney, Agent, or Firm* — Pillsbury Winthrop Shaw Pittman LLP

(57) ABSTRACT

According to various embodiments, a computer-implemented method is disclosed that includes receiving a field in a frame or a frame from the one or more STAs, wherein the field in a frame or the frame includes information on buffered traffic and a timeout value for a given access category (AC); and scheduling the one or more STAs to transmit uplink traffic simultaneously through a polling frame.

24 Claims, 4 Drawing Sheets

(56) References Cited

OTHER PUBLICATIONS

IEEE Computer Society LAN MAN Standards Committee, IEEE Standard 802.11e: Amendment to IEEE Std. 802.11: Medium Access Control (MAC) Quality of Service Enhancements, IEEE, Nov. 2005.*

International Search Report and Written Opinion mailed Jan. 2, 2012, for PCT/US2011/043187.

* cited by examiner

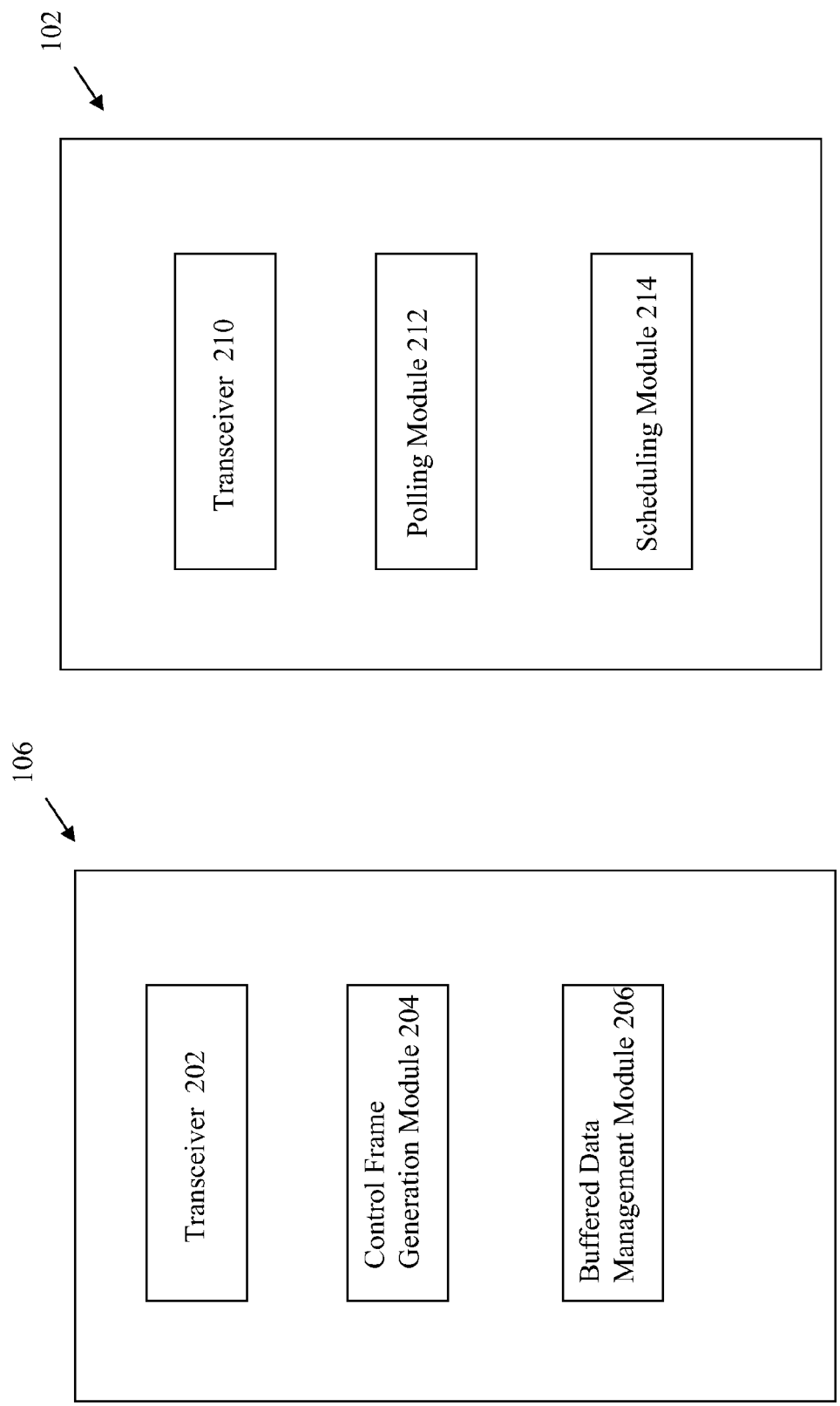

METHODS AND APPARATUS FOR UPLINK MU MIMO SCHEDULING

This disclosure relates generally to the field of wireless communication, and in particular to scheduling uplink transmissions in a network that utilizes Uplink (UL) Multi-User (MU) Multiple-Input and Multiple-Output (MIMO)

MU MIMO is a signal transmission technique used in wireless communication systems where multiple mobile stations (STAs) are allowed to communicate with an access point (AP) having multiple antenna elements sharing a same transmission time and frequency. Utilizing UL MU MIMO, the AP is configured to receive, via multiple spatially apart antenna elements, combined signals simultaneously transmitted from a plurality of STAs and separate the received signals into independent signals from each STA through appropriate signal processing. Utilizing downlink (DL) MU MIMO, the AP transmits directional radio signals via multiple spatially separated antenna elements towards intended STAs.

To facilitate UL MU MIMO transmission, an AP schedules uplink transmissions from multiple STAs. Because all STAs participate in the same UL MU MIMO transmission needs to be transmitted simultaneously and thus, the AP needs to poll STAs that can participate in the same UL MU MIMO transmission. Scheduling mechanisms are required at the AP so that the AP can poll STAs more efficiently. Moreover, a signaling mechanism is needed for the AP to be informed of the buffered traffic at each STA and to determine when to poll and which STAs to poll.

BRIEF DESCRIPTION OF THE DRAWINGS

FIG. 2 is a block diagram illustrating an example STA, according to an embodiment.

FIG. 3 is a block diagram illustrating an example AP, according to an embodiment.

DETAILED DESCRIPTION

Definitions

Figure 1:
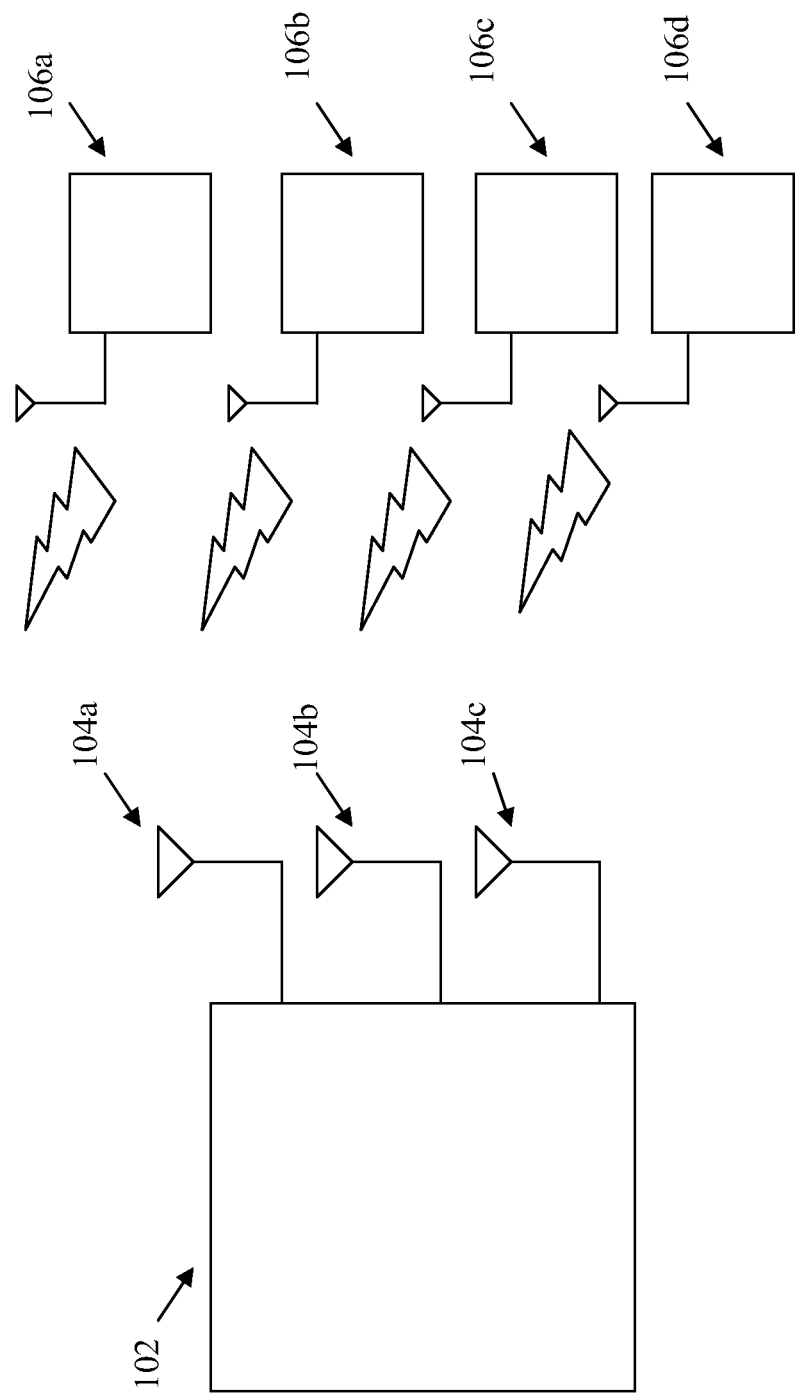
FIG. 1 illustrates an example network architecture in accordance with various aspects of the present disclosure.

Access Category (AC): A label for the common set of enhanced distributed channel access (EDCA) parameters that are used by a quality of service (QoS) station (STA) to contend for the channel in order to transmit medium access control (MAC) service data united (MSDUs) with certain priorities.

Access Point (AP): Any entity that has a station (STA) functionality and provides access to the distribution services, via the WM for associated STAs.

Channel: An instance of communications medium use for the purpose of passing protocol data units (PDUs) between two or more stations (STAs).

Enhanced Distributed Channel Access (EDCA): The prioritized carrier sense multiple access with collision avoidance (CSMA/CA) access mechanism used by quality of service (QoS) stations (STAs) in a QoS basic service (BSS). This access mechanism is also used by the QoS access point (AP) and operates concurrently with hybrid coordination function (HCF) controlled channel access (HCCA).

Enhanced Distributed Channel Access Function (EDCAF): A logical function in a quality of service (QoS) station (STA) that determines, using enhanced distributed channel access (EDCA), when a frame in the transmit queue with the associated access category (AC) is permitted to be transmitted via the wireless medium (WM). There is one EDCAF per AC.

Frame: A basic unit for data transmission between stations.

Mobile Station (MS): A type of STA that uses network communications while in motion.

Multiple-Input and Multiple-Output (MIMO): MIMO is the use of multiple antennas at both the transmitter and receiver.

MU: Multi-User.

Piggyback: The overloading of a data frame with an acknowledgement of a previously received medium access control (MAC) protocol data unit (MPDU) and/or a poll to the station (STA) to which the frame is directed.

Prioritized Quality of Service (QoS): The provisioning of service in which the medium access control (MAC) protocol data units (MPDUs) with higher priority are given a preferential treatment over MPDUs with a lower priority. Prioritized QoS is provided through the enhanced distributed channel access (EDCA) mechanism.

Station (STA): Any device that contains an IEEE 802.11-conformant medium access control (MAC) and physical layer (PHY) interface to the wireless medium (WM).

Uplink (UL): A unidirectional link from a non-access point (non-AP) station (STA) to an access point (AP).

Wireless medium (WM): The medium used to implement the transfer of protocol data units (PDUs) between peer physical layer (PHY) entities of a wireless local area network (LAN).

Description

In accordance with an aspect of the present disclosure, a computer-implemented method is disclosed that includes receiving a field or a frame from the one or more stations (STAs) at an access point (AP), wherein the field or the frame includes information on buffered traffic and a timeout value for a given access category (AC); and scheduling the one or more STAs to transmit uplink traffic simultaneously through a polling frame.

In accordance with an aspect of the present disclosure, an apparatus is disclosed that includes a receiver arranged to receive a field or a frame from the one or more stations (STAs) at an access point (AP), wherein the field or the frame includes information on buffered traffic and a timeout value for a given access category (AC); and a schedule module arranged to schedule the one or more STAs to transmit uplink traffic simultaneously through a polling frame.

In accordance with an aspect of the present disclosure, a method is disclosed that includes searching one or more STAs with non-zero buffered traffic; choosing one STA of the one or more STAs with an earliest determined deadline; choosing another STA of the one or more STAs that meets $$i = \arg\min_{k \notin \Omega; m \in \theta} deadline[k][m]$$

where $\Omega$ denotes a set of STAs that have been chosen for an upcoming UL MU MIMO transmission and $\theta$ represents a set of ACs at the AP; and adding the STA to the set $\Omega$.

In accordance with an aspect of the present disclosure, an apparatus is disclosed that includes a processor that is arranged to execute instructions on a computer-readable storage medium including the functions of: searching one or more STAs with non-zero buffered traffic; choosing one STA of the one or more STAs with an earliest determined deadline; choosing another STA of the one or more STAs that meets $$i = \arg\min_{k \notin \Omega; m \in \theta} deadline[k][m]$$

where $\Omega$ denotes a set of STAs that have been chosen for an upcoming UL MU MIMO transmission and $\theta$ represents a set of ACs at the AP; and adding the STA to the set $\Omega$.

In accordance with an aspect of the present disclosure, a method is disclosed that includes determining a timeout value per access category (AC), by an access point (AP), when the AP receives buffered traffic information from one or more stations (STAs).

In accordance with an aspect of the present disclosure, an apparatus is disclosed that includes a processor that is arranged to execute instructions on a computer-readable storage medium including the functions of: determining a timeout value per access category (AC), by an access point (AP), when the AP receives buffered traffic information from one or more stations (STAs).

In accordance with an aspect of the present disclosure, a computer-implemented method is disclosed that includes transmitting, by station (STA), a field or a frame at an access point (AP), wherein the field or the frame includes information on buffered traffic and a timeout value for a given access category (AC).

In accordance with an aspect of the present disclosure, an apparatus is disclosed that includes a transmitter arranged to transmit, by station (STA), a field or a frame at an access point (AP), wherein the field or the frame includes information on buffered traffic and a timeout value for a given access category (AC).

Various embodiments disclosed herein relate to a computer-implemented method that allows an AP to efficiently poll various information from STAs and capable of transmitting various types of MAC frames using uplink mechanism. To facilitate UL MU MIMO transmission, an AP schedules uplink transmissions from multiple STAs. Because all STAs participate in the same UL MU MIMO transmission need to transmit simultaneously, the AP needs to poll STAs that can participate in the same UL MU MIMO transmission. To avoid blindly polling STAs without buffered traffic, the AP needs to estimate the buffered traffic at each STA and determines when to poll and which STAs to poll. To facilitate UL MU MIMO transmissions, a STA signals its buffered traffic information to the AP. Upon receiving buffered traffic information from one or more STAs, the AP schedules some STAs to transmit uplink traffic simultaneously.

According to various embodiments, each STA with buffered traffic may include a buffered traffic status such as a request for a transmission right and/or queue size of buffered traffic in any uplink frame. The STAs can contend to transmit uplink data frames using EDCA and the buffered traffic status may be piggybacked with the uplink data frames. The AP may poll multiple STAs for an UL MU MIMO transmission. After a STA receives a polling frame including a particular transmission right granted to each of the STAs, it can transmit its buffered traffic during a period determined by the AP.

The UL MIMO STA may employ a signaling mechanism to notify the AP about buffered traffic from each UL MIMO STA per AC and a timeout value per AC. Two scheduling mechanisms may be used to enable an AP to intelligently and effectively schedule UL MU MIMO transmissions from different STAs. The first scheduling involves an earliest deadline first scheduling approach and the second scheduling mechanism involves a hybrid approach.

The QoS channel access method for the IEEE 802.11 Wireless LANs is the Enhanced Distributed Channel Access (EDCA) mechanism, which differentiates transmission treatments for data frames belonging to different traffic categories with four different levels of channel access priority. Frames may be queued for transmission to an AP and frames may be of different size. In determining the order in which frames should be transmitted, the AP may utilize information, including access category information, to formulate a relative priority between the pending data.

IEEE 802.11 specifies priorities, referred to as user priorities (UP) and a packet with a specific UP belongs to an access category (AC) ranging from packets having the lowest tolerance for delay (highest priority) to those having the most delay tolerance (lowest priority). For example, AC_BK (Background) and AC_BE (Best Effort) tend to have the highest tolerance for delay. Theses ACs can include applications such as web surfing and email. The ACs having the least tolerance for day include AC_VI (Video) and AC_VO (Voice).

FIG. 1 illustrates an example architecture of a system 100 in accordance with various aspects of the present disclosure. The system 100 may include AP 102 configured to wirelessly communicate with associated STAs 106a, 106b, 106c and 106d (hereinafter "STA 106") via multiple spatially separated antenna elements 104a-104c. STAs 106a and 106b may simultaneously transmit radio signals to AP 102 using same frequency band and same transmission time using, for example, UL mechanism. AP 102 may receive the signals simultaneously transmitted from the STAs via the antenna elements 104a-104c and separate the received signals into a plurality of individual signals each corresponding to the transmission signal from each STA. AP 102 may communicate with STA 106 various types of frames that may be used to coordinate schedules for frame transmissions between AP 102 and STA 106. AP 102 may be configured as an Access Point (AP) in the IEEE 802.11 standard.

FIG. 2 is a block diagram illustrating an example STA 106 in accordance with various aspects of the present disclosure. STA 106 may include, among others, a transceiver 202, a control frame generation module 204 and buffered data management module 206. Transceiver 202 may transmit to and receive various communications from AP 102 via the wireless medium. For example, transceiver 202 may receive from AP 102 various communications, including a group polling and polling frames; and transmit to AP 102 various communications.

FIG. 3 is a block diagram illustrating an example AP 102 in accordance with various aspects of the present disclosure. AP 102 may include, among others, a transceiver 210, a polling module 212 and a scheduling module 214 arranged to execute a scheduling algorithm, discussed below. Transceiver 210 may transmit data; i.e., but not limited to, polling frames, and receive data; i.e., but not limited to, control field or control frames, from STAs via the wireless medium. The polling module 212 may interact with the scheduling module 214 to transmit the polling frames to the STAs and schedule buffered traffic from the STAs.

Figure 4:
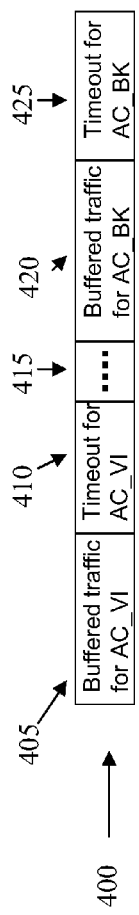
FIG. 4 shows example fields in a frame sent from an UL MU MIMO STA to the AP in accordance with various aspects of the present disclosure.

A STA indicates buffered traffic information in units of 256 octets either in the QoS control field of a QoS data packet or in a control frame. The fields included in the control frame are illustrated in FIG. 4. FIG. 4 shows example fields in a frame 400 sent from an UL MU MIMO STA to the AP. Fields 405-425 include buffer traffic and timeout information on different ACs. For example, fields 405 and 410 include information on buffered traffic and timeout value for AC_VI, respectively. Field 415 is a generic representative field that can be used for buffered traffic and timeout values for AC_VO and AC_BE. Fields 420 and 425 include information on buffered traffic and timeout value for AC_BK, respectively.

The AP maintains a data structure that records buffered traffic information for all UL MIMO-capable STAs. To improve QoS for different ACs, the AP also maintains a timeout value per STA per AC, which records a timeout interval in predetermined units of time, for example in units of 64 μs.

In accordance with various aspects, setting and maintaining the timeout value can be determined in a variety of manners. In one embodiment, the AP determines a timeout value per AC as soon as the AP receives buffered traffic information from a STA. In another embodiment, a STA indicates a timeout value along with the buffered traffic information in the frame that the STA transmits to the AP.

Every time the AP receives new information from a STA, the AP can update the buffered traffic information per AC for the STA, record the received time of the frame, and reset the timeout value. The sum of the frame received time and the timeout value is the deadline before which the AP needs to poll the corresponding STA. All deadlines associated with zero buffered traffic can be set to a predetermined value, for example, infinity (0xFFFF).

In some aspects, the AP can schedule STAs using an Earliest Deadline First Scheduling algorithm. In this instance, the AP searches the deadlines associated with non-zero buffered traffic and looks for the STA with the earliest deadline:

$$j = \arg\min_{k \in \Theta; m \in \theta} deadline[k][m] \quad (1)$$

where deadline [k][m] denotes the deadline associated with the kth user's mth AC queue, Θ represents a set of STAs that have non-zero buffered traffic, and θ represents a set of ACs. In this approach, the AP schedules the STA with the earliest deadline.

Once the AP has chosen the first STA and the corresponding AC queue, it searches through the buffered traffic data structure to look for STAs that meet criterion (2).

$$i = \arg\min_{k \notin \Omega; m \in \theta} deadline[k][m] \quad (2)$$

where Ω denotes the set of STAs that have been chosen for the upcoming UL MU MIMO transmission and θ represents a set of ACs at the AP.

Figure 5:
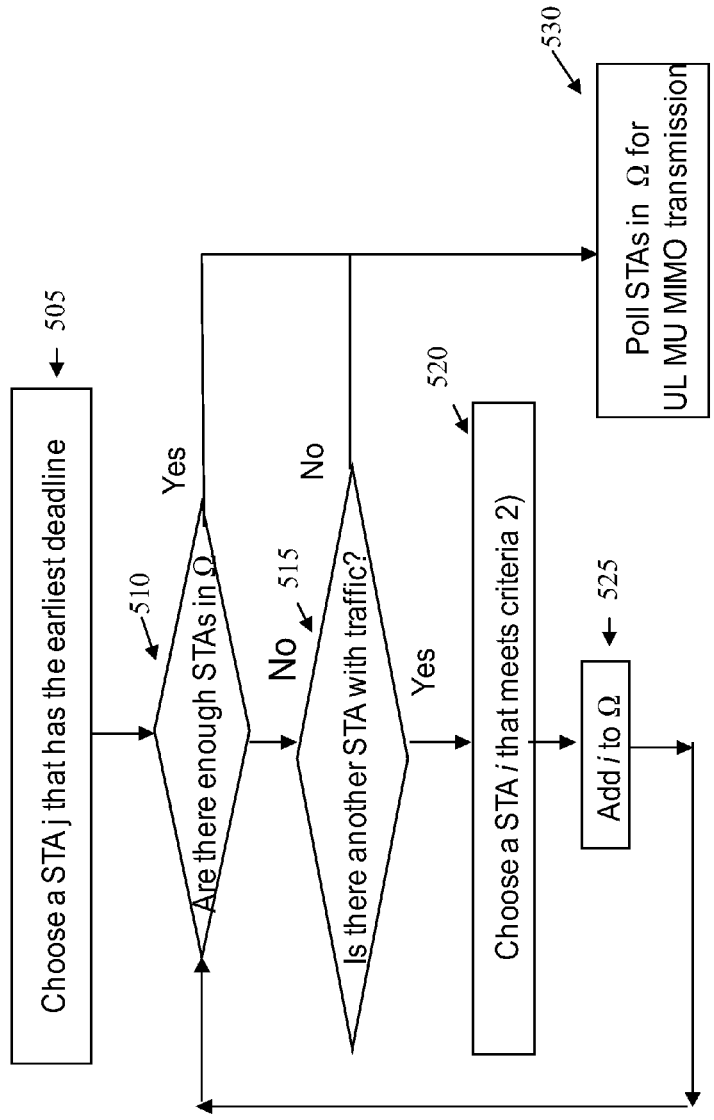
FIG. 5 shows an example flow chart of an earliest deadline first scheduling algorithm in accordance with various aspects of the present disclosure.

FIG. 5 illustrates a flow chart of the earliest deadline first scheduling algorithm. At 505, the AP searches all STAs with non-zero buffered traffic and chooses a STA with the earliest deadline. At 510, the AP determines if there are enough STAs in the set Ω. If the determination is no, then the process continues to 515 where a determination is made by the AP as to whether there is another STA with traffic to transmit. If the determination is yes indicating that there are still spatial streams left to accommodate more STAs, then the process continues to 520 where the AP chooses a STA that meets criterion (2) and adds, at 525, the STA to the set Ω. The process can then loop back to the determination at 510. If the determination at 510 is yes and or the determination at 515 is no indicating that the set Ω is full or no more STA has traffic in the same AC, then the process proceeds to 530 where the STAs are polled in the set Ω for UL MU MIMO transmissions.

In some aspects, the AP can schedule STAs using a Hybrid Scheduling algorithm. An AP can aggregate as many packets as possible before transmitting them out in one transmission. In one UL MU MIMO transmission, multiple STAs can transmit from different ACs. In this scheduling method, the AP searches the deadlines associated with non-zero buffered traffic and looks for the STA with the earliest deadline. The AP compares the earliest deadline with a pre-defined threshold for the AC. If the chosen deadline is below the pre-defined threshold for the AC, the AP schedules the STA. If the chosen deadline is above the threshold, the AP continues to search for an earliest deadline associated with other STAs. The AP chooses STA with earliest deadlines that are below the pre-defined threshold with the corresponding AC until it has enough number of STAs to poll. If the AP has chosen all the STAs with the earliest deadlines that are below the thresholds but more STAs can be accommodated in one UL MU MIMO transmission, the AP can choose the rest of STAs based on the medium duration.

If no deadline is below the pre-determined threshold or more STAs can be accommodated in one UL MU MIMO transmission, the AP chooses a STA with the maximum medium duration, the AP chooses a STA with the maximum medium duration:

$$j = \arg\max_{k \in \Theta; m \in \theta} \frac{aggregate\_pkt\_len[k][m]}{data\_rate[k]} \quad (3)$$

where aggregate_pkt_len [k][m] is the length of the aggregated packet from the STA k and the corresponding AC m and data_rate [k] is the data rate between the AP and the STA k.

Once the AP has chosen the first user, it searches through the buffered traffic data structure to look for STAs that have met criterion (4)

$$j = \arg\max_{k \notin \Omega} \frac{aggregate\_pkt\_len[k][AC]}{data\_rate[k]} \quad (4)$$

where Ω denotes the set of STAs that have been chosen for the upcoming UL MU MIMO transmission and θ represents a set of ACs.

Figure 6:
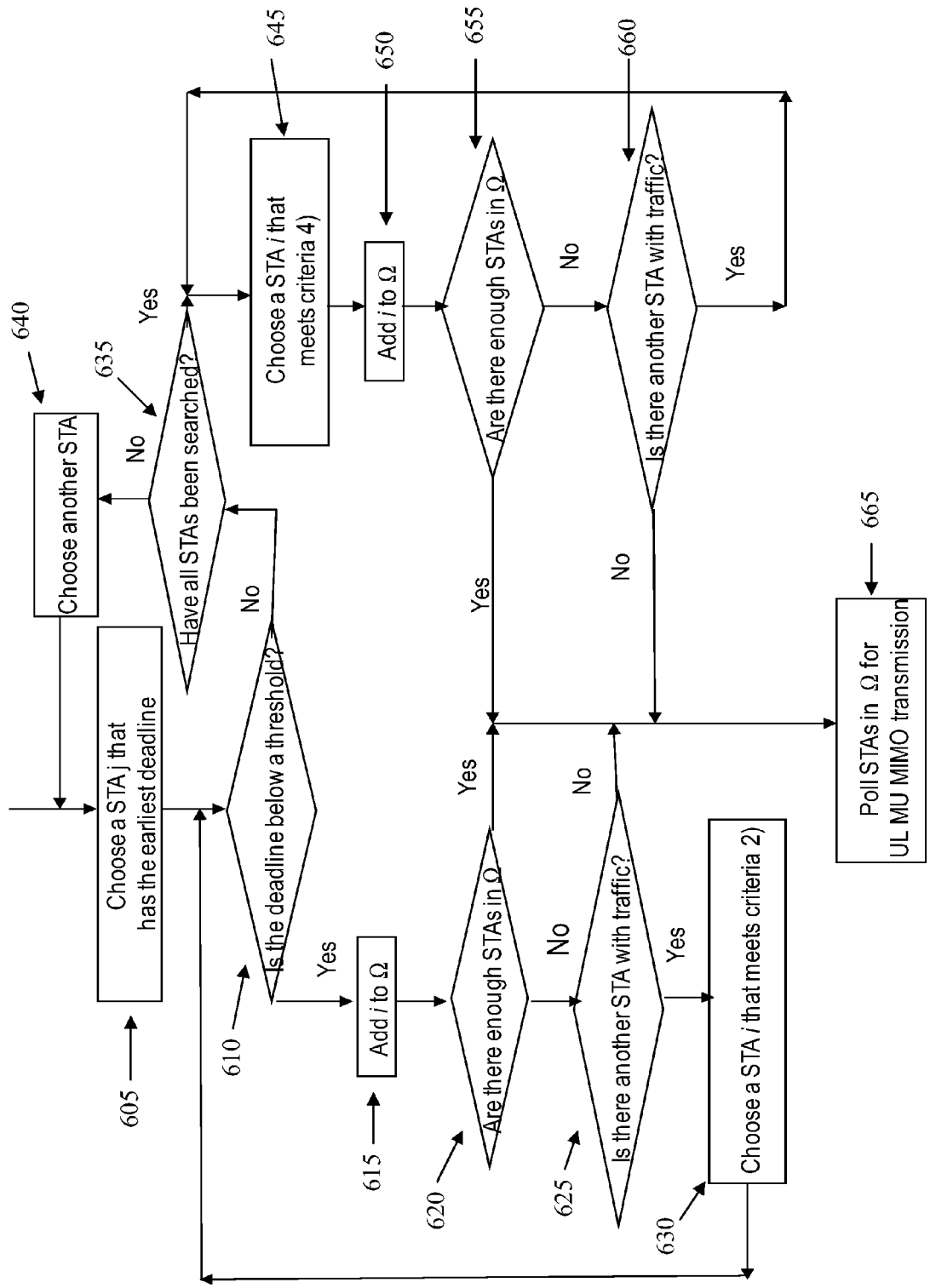
FIG. 6 shows an example flow chart of a hybrid scheduling algorithm in accordance with various aspects of the present disclosure.

FIG. 6 illustrates the flow chart of the hybrid scheduling algorithm. At 605, the AP chooses a STA j with the earliest deadline. If the AP determines, at 610, that the earliest deadline is below the pre-defined threshold, the AP chooses the STA as the first user i in the set Ω at 615. At 620, the AP determines whether there are enough STAs in the set Ω. If the result of the determination at 620 is yes, then the AP includes other STAs i that meet criteria (2) in the set Ω at 630. If the result of the determination at 620 is yes or the no at 625 indicating that there are enough STAs in Ω, the AP polls the STAs in Ω for UL MU MIMO transmission at 665. The process can loop back to 610 after 630 to determine whether the deadline is below a threshold. If the AP determines, at 610, that no STA meets the threshold criterion, the AP determines whether all STAs have been searched at 635. If the result of the determination at 635 is no, then the AP chooses anther STA at 640 the process begins again at 605. If the AP determines that all STAs have been search at 635, then the AP chooses STAs i that meets criterion (4) at 645. At 650, the AP adds STA i to the set Ω. At 655, the AP determines whether there are enough STAs in the set Ω. If the result of the determination at 655 is that there are not enough STAs in the set Ω, then the AP determines if there is another STA with traffic at 660, and if so, then the process loops back to 645. If there are enough STAs in Ω as determined at 655 or there is not another STA with traffic at 660, the AP polls the STAs in Ω for UL MU MIMO transmission at 665.

In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A computer-implemented method comprising:
receiving a field or a frame from one or more stations (STAs) at an access point (AP), wherein the field or the frame includes information on buffered traffic and a timeout value for a given access category (AC); and
scheduling the one or more STAs to transmit uplink traffic simultaneously through a polling frame, wherein the scheduling comprises determining an earliest deadline for the one or more STAs, wherein the determining is performed according to $$j = \arg\min_{k \in \Theta; m \in \upsilon} deadline[k][m]$$

where deadline [k][m] denotes the deadline associated with the kth user's mth AC queue, Θ represents a set of STAs that have non-zero buffered traffic, and υ represents a set of ACs.

2. The method of claim 1, wherein the field is in the frame or a different frame, and the field includes a quality of service (QoS) control field of a QoS data packet.

3. The method of claim 1, further comprising maintaining a data structure that is arranged to record the buffered traffic information and the timeout value for the one or more STAs per AC, wherein the one or more STAs are uplink (UL) multi-user (MU) multiple-input and multiple-output (MIMO)-capable STAs.

4. The method of claim 3, further comprising determining the timeout value per AC after the AP receives the buffered traffic information from the one or more STAs.

5. The method of claim 1, wherein the scheduling further comprises:
searching, by an AP, deadlines for the one or more STAs associated with non-zero buffered traffic.

6. The method of claim 1, further comprising searching through the buffered traffic data to determine which STAs meet $$i = \arg\min_{k \notin \Omega; m \in \vartheta} deadline[k][m]$$

where Ω denotes the set of STAs that have been chosen for the upcoming UL MU MIMO transmission and υ represents a set of ACs at the AP.

7. A computer-implemented method comprising:
receiving a field or a frame from one or more stations (STAs) at an access point (AP), wherein the field or the frame includes information on buffered traffic and a timeout value for a given access category (AC); and
scheduling the one or more STAs to transmit uplink traffic simultaneously through a polling frame, wherein the scheduling comprises:
searching, at the AP, the deadlines associated with non-zero buffered traffic;
choosing a STA within the one or more STAs with the earliest deadline;
comparing the earliest deadline with a pre-defined threshold for a given AC; and
scheduling the STA if the earliest deadline is below the pre-defined threshold for the given AC.

8. The method of claim 7, further comprising searching for the earliest deadline associated with another STA of the one or more STAs if the chosen deadline is above the pre-defined threshold.

9. The method of claim 8, further comprising choosing a STA with the earliest deadline that is below the pre-defined threshold with the corresponding AC until the AP has enough numbers of STAs to poll.

10. The method of claim 8, further comprising choosing a reminder of the one or more STAs based on a medium duration if there is additional accommodation in an UL MU MIMO transmission.

11. The method of claim 10, further comprising choosing a STA by the AP with a maximum medium duration according to $$j = \arg\max_{k \in \Theta; m \in \vartheta} \frac{\text{aggregate\_pkt\_len}[k][m]}{\text{data\_rate}[k]}.$$

12. The method of claim 11, further comprising searching through the buffered traffic data structure once the AP has chosen the first user to look for STA meeting $$j = \underset{k \notin \Omega}{\operatorname{argmax}} \frac{\text{aggregate\_pkt\_len}[k][AC]}{\text{data\_rate}[k]}$$

where Ω denotes the set of STAs that have been chosen for the upcoming UL MU MIMO transmission and ν represents a set of ACs.

13. A method comprising:
searching one or more STAs with non-zero buffered traffic;
choosing one STA of the one or more STAs with an earliest determined deadline;
choosing another STA of the one or more STAs that meets $$i = \arg\min_{k \notin \Omega; m \in \vartheta} \text{deadline}[k][m]$$

where Ω denotes a set of STAs that have been chosen for an upcoming UL MU MIMO transmission and ν represents a set of access categories (ACs) at the AP; and
adding the STA to the set Ω.

14. The method of claim 13, further comprising polling the one or more STAs in the set Ω for UL MU MIMO transmissions.

15. A computer-implemented method comprising:
receiving a field or a frame from one or more stations (STAs) at an access point (AP), wherein the field or the frame includes information on buffered traffic and a timeout value for a given access category (AC); and
scheduling the one or more STAs to transmit uplink traffic simultaneously through a polling frame,
wherein a deadline is determined by a timeout field in the received frame from the STA or by the AP,
wherein when the deadline is determined by a timeout field, the AP updates the deadline associated with the buffered traffic for a STA if the timeout value indicated in a newly received frame shows an earlier deadline.

16. A computer-implemented method comprising:
determining a timeout value per access category (AC) per station (STA), by an access point (AP), when the AP receives buffered traffic information from one or more STAs, wherein the buffered traffic information is recorded in a data structure; and
updating, by the AP, the recorded buffered traffic information per AC per STA for the one or more STAs in the data structure when the AP receives new buffered traffic information from the one or more STAs, wherein a deadline to poll a STA is based at least on the timeout value associated with that STA, and a deadline to poll a STA associated with zero buffered traffic is set to a predetermined value.

17. The method of claim 16, further comprising:
recording a received time of a frame including the buffered traffic information received from one of the one or more STAs; and
resetting the timeout value associated with the one of the one or more STAs.

18. The method of claim 17, wherein a sum of the frame received time and the timeout value is the deadline before which the AP needs to poll the one of the one or more STAs.

19. An apparatus comprising:
a receiver arranged to receive a field or a frame from one or more stations (STAs) at an access point (AP), wherein the field or the frame includes information on buffered traffic and a timeout value for a given access category (AC); and
a schedule module arrange to schedule the one or more STAs to transmit uplink traffic simultaneously through a polling frame, wherein the schedule module is arranged to determine an earliest deadline for the one or more STAs according to:

$$j = \arg\min_{k \in \Theta; m \in \nu} \text{deadline}[k][m]$$

where deadline [k][m] denotes the deadline associated with the kth user's mth AC queue, Θ represents a set of STAs that have non-zero buffered traffic, and ν represents a set of ACs.

20. The apparatus of claim 19, wherein the schedule module is further arranged to search through the buffered traffic data to determine which STA meets:

$$i = \arg\min_{k \notin \Omega; m \in \nu} \text{deadline}[k][m]$$

where Ω denotes the set of STAs that have been chosen for the upcoming UL MU MIMO transmission.

21. An apparatus comprising:
a receiver arranged to receive a field or a frame from one or more stations (STAs) at an access point (AP), wherein the field or the frame includes information on buffered traffic and a timeout value for a given access category (AC); and
a schedule module arranged to schedule the one or more STAs to transmit uplink traffic simultaneously through a polling frame, wherein the schedule module is arranged to:
search, at the AP, the deadlines associated with non-zero buffered traffic;
choose a STA within the one or more STAs with the earliest deadline;
compare the earliest deadline with a pre-defined threshold for a given AC; and
schedule the STA if the earliest deadline is below the pre-defined threshold for the given AC.

22. The apparatus of claim 21, wherein the schedule module is further arranged to choose a STA by the AP with a maximum medium duration according to:

$$j = \arg\max_{k \in \Theta; m \in \nu} \frac{\text{aggregate\_pkt\_len}[k][m]}{\text{data\_rate}[k]}.$$

23. An apparatus comprising a processor arranged to:
determine a timeout value per access category (AC) per station (STA) when buffered traffic information is received from one or more STAs, wherein the buffered traffic information is recorded in a data structure; and
update the recorded buffered traffic information per AC per STA in the data structure when new buffered traffic information is received from the one or more STAs, wherein a deadline to poll a STA is based at least on the timeout value associated with that STA, and a deadline to poll a STA associated with zero buffered traffic is set to a predetermined value.

24. The apparatus of claim 23, wherein the processor is further arranged to:

record a received time of a frame including the buffered traffic information received from one of the one or more STAs; and reset the timeout value associated with the one of the one or more STAs.

* * * * *